United States Patent [19]
Olsen

[11] 4,198,867
[45] Apr. 22, 1980

[54] TEMPERATURE COMPENSATING MEANS FOR PRESSURE MEASURING APPARATUS

[75] Inventor: Everett O. Olsen, Wrentham, Mass.

[73] Assignee: The Foxboro Company, Foxboro, Mass.

[21] Appl. No.: 962,988

[22] Filed: Nov. 22, 1978

Related U.S. Application Data

[62] Division of Ser. No. 834,481, Sep. 19, 1977, Pat. No. 4,165,651.

[51] Int. Cl.² ............... G01L 11/00; G01L 13/00
[52] U.S. Cl. .......................... 73/704; 73/708; 73/717
[58] Field of Search ............. 73/704, 708, 716, 717, 73/723, 728, 753

[56] References Cited

U.S. PATENT DOCUMENTS

| | | | |
|---|---|---|---|
| 2,087,494 | 7/1937 | Annin | 73/708 |
| 3,140,613 | 7/1964 | Hasegawa | 73/716 |
| 3,393,565 | 7/1968 | Klee | 73/704 |
| 3,990,309 | 11/1976 | Beckwith et al. | 73/708 |

*Primary Examiner*—Donald O. Woodiel
*Attorney, Agent, or Firm*—Parmelee, Johnson, Bollinger & Bramblett

[57] ABSTRACT

A differential-pressure measuring instrument comprising a main body assembly with a pair of diaphragms each subject to a respective fluid pressure. The diaphragms enclose a sealed chamber containing a fill-liquid surrounding a non-magnetic vibratable wire which is tensioned in accordance with the applied differential pressure. A magnetic field passes transversely through the wire, and electrical current is supplied to the wire by electronic circuit means to produce a vibratory force on the wire as a result of interaction between the electrical current and the magnetic field.

3 Claims, 10 Drawing Figures

TEMPERATURE COMPENSATING MEANS FOR PRESSURE MEASURING APPARATUS

This is a division of application Ser. No. 834,481 filed Sept. 19, 1977, now U.S. Pat. No. 4,165,651.

BACKGROUND OF THE INVENTION

1. Field of the Invention

This invention relates to measuring instruments responsive to fluid pressure. More particularly, this invention relates to such instruments of the type utilizing a vibratable-wire as the basic force-sensing element.

2. Description of the Prior Art

Instrumentation systems for use with industrial processes have for many years utilized apparatus of various kinds for measuring fluid pressures, especially differential pressures such as are produced across an orifice plate in a flow pipe for the purpose of developing a fluid flow-rate signal. Commonly such apparatus has comprised a differential-pressure cell of the force-balance type, such as shown in U.S. Pat. No. 3,564,923. Although such instruments have performed admirably over a number of years, it has become evident that the conventional devices do not fully meet the needs of modern industrial process instrumentation systems. For example, modern systems have a considerably greater need for stability and accuracy over widely varying conditions, such as temperature, etc., than can be met by conventional prior art equipment.

It had long ago been proposed by workers in the measuring instrument art to use a vibratable-wire as the basic sensing element for pressure-responsive instruments. Such proposals were based on the understanding that the frequency of wire vibration was closely related to the tension in the wire, and the recognition that the wire tension could in turn be controlled by a differential pressure to be measured. Thus, the frequency of wire vibration could be developed as a measurement signal responsive to differential pressure. Moreover, theoretical considerations indicated that such an instrument could be highly accurate in performance.

There are many prior patent disclosures of vibratable-wire devices, and simply as an indication of several types of such prior art, reference may be made to U.S. Pat. Nos. 2,447,817; 2,455,021; and 3,047,789. U.S. Pat. No. 3,393,565 describes several vibratable-wire instruments intended for measuring differential pressure, and shows in FIG. 2 a device with the wire in a liquid-filled container. The structure of FIG. 2 includes a pivoted lever 26 for coupling an input force to the wire, and in column 3, at line 15 et seq. there is suggested a modification wherein the lever is eliminated and the wire is secured directly to one of the diaphragms.

The proposed instruments resulting from such early work with vibratable-wire sensors have, however, not found acceptance in the art of process instrumentation, primarily because they have not been capable of adequate performance under required operating conditions. Such earlier proposals thus did not provide practical solutions to the problem, and did not advance the state of the art to the point where the results achieved were useful to the process industries.

A more recent development in the art of pressure-responsive instruments has resulted in an accurate and practical vibrating-wire instrument for measuring differential gas pressures. A description of that instrument is set forth in copending application Ser. No. 732,130, filed by E. O. Olsen et al. on Oct. 13, 1976. An electronic transmitter adapted for use with such a vibrating-wire instrument is disclosed in copending application Ser. No. 732,129, filed by E. O. Olsen et al. on Oct. 13, 1976.

Although the differential-gas-pressure instrument referred to above has performance abilities suited for its intended purpose, it does not have the capability of serving as a general purpose differential-pressure instrument for industrial processes. Specifically, that apparatus is not capable of measuring the various differential liquid pressures which must be measured in most commercial processes of the present day.

SUMMARY OF THE INVENTION

In a preferred embodiment of the invention to be described hereinbelow, a general purpose differential-pressure measuring instrument is provided comprising a main body assembly with a pair of diaphragms each subject to a respective fluid pressure. The diaphragms enclose a sealed chamber containing a fill-liquid surrounding a non-magnetic vibratable wire which is tensioned in accordance with the applied differential pressure. A magnetic field passes transversely through the wire, and electrical current is supplied to the wire by electronic circuit means to produce a vibratory force on the wire as a result of interaction between the electrical current and the magnetic field.

In accordance with one aspect of the invention, the vibratable wire is effectively enclosed within a sealed tubular passageway of very small cross-sectional dimension assuring low internal liquid volume and close interaction with the magnet, yet permitting vibration of the wire without interference from wall or boundary effects. The magnet pole-pieces are located along opposite sides of this passageway, and produce a high-intensity magnetic field to enable strong vibration of the wire to aid in developing a suitably high output signal level. In accordance with a further aspect of the invention, the tube surrounding the wire is closed at one end, and the wire is secured to that closed end, providing significant advantages in several important respects as will be described.

In accordance with still other facets of the invention, special means are provided to minimize substantially the effects on the performance of the instrument of changes in external conditions such as temperature and static pressure. Another important aspect of the invention relates to selective orientation of the vibratable wire with respect to the magnetic field so as to assure stable vibrations of proper amplitude. The disclosed instrument also includes unique means to prevent damage to the wire, or other elements of the device, in the event of over-range pressure conditions.

Accordingly, it is a principal object of this invention to provide a commercially practical pressure measuring instrument of the vibratable-wire type. Other important objects, aspects and advantages of the invention will in part be pointed out in, and in part apparent from, the following description together with the accompanying drawings.

DESCRIPTION OF THE PREFERRED EMBODIMENTS

Figure 1:
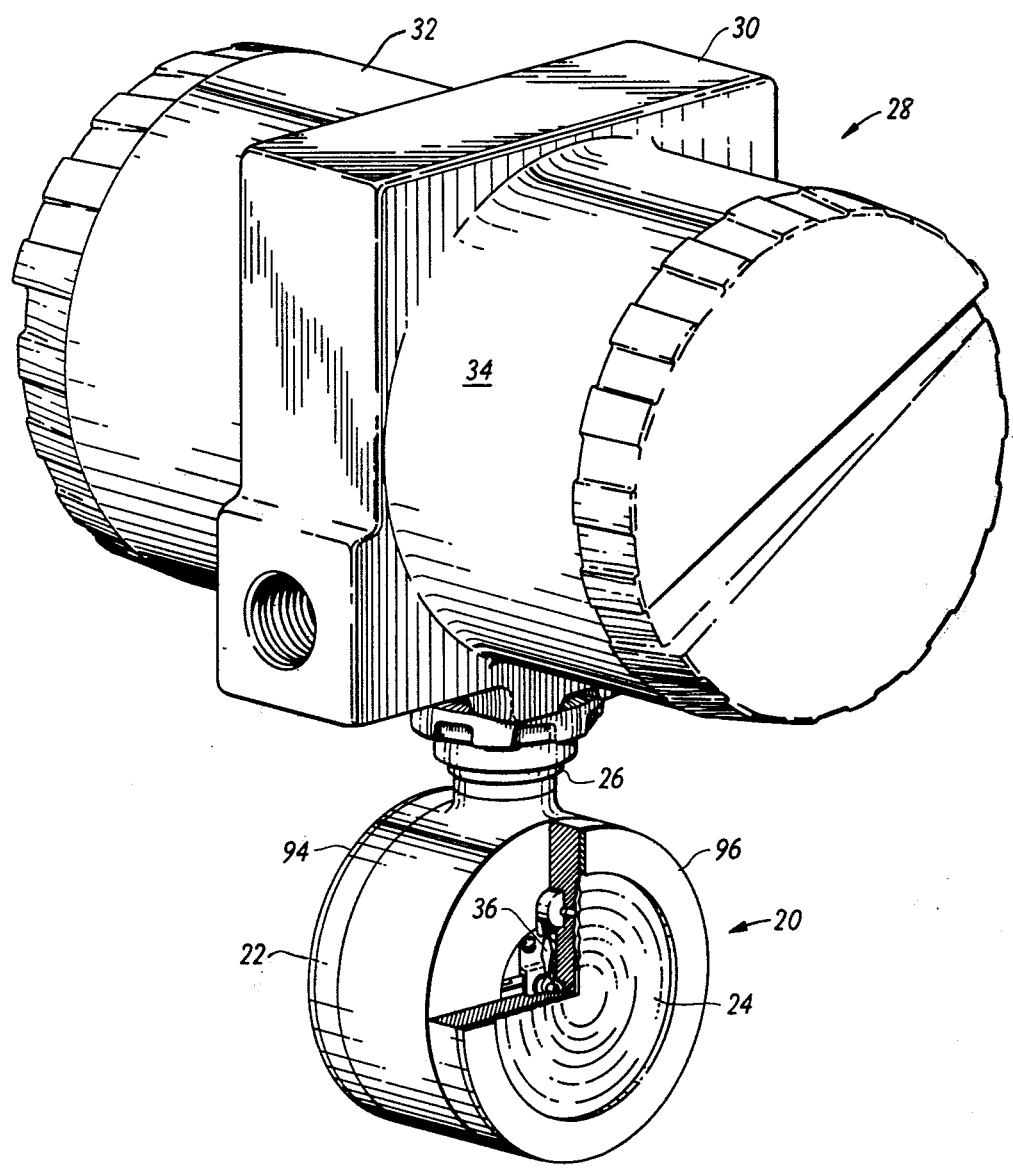
FIG. 1 is a perspective view, partially cut-away, of an instrument in accordance with the present invention.
Figure 2:
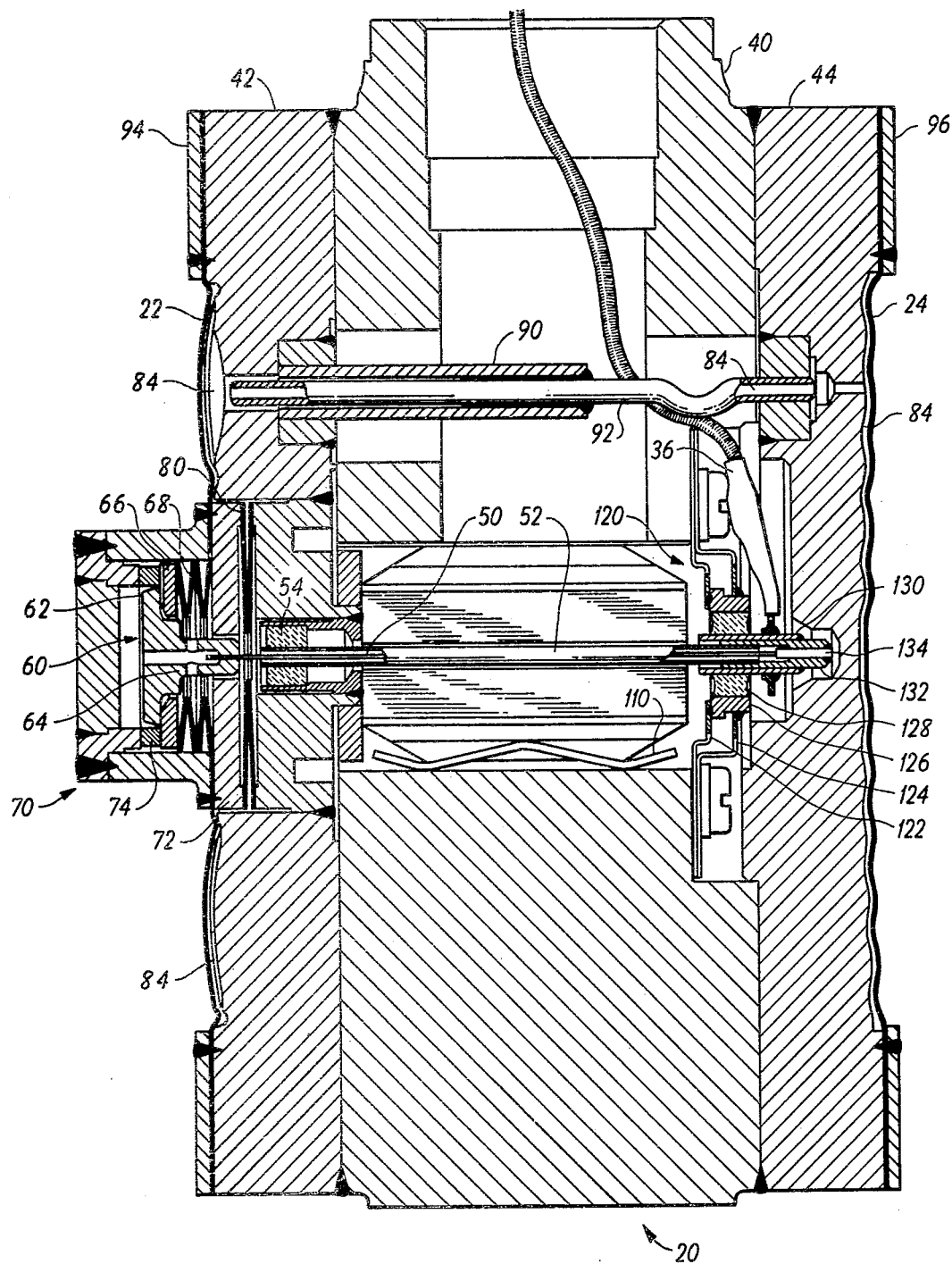
FIG. 2 is a vertical section through the central body assembly of the instrument shown in FIG. 1.

Referring now to FIGS. 1 and 2, a differential-pressure measuring instrument is shown comprising a lower body assembly generally indicated at 20 and having diaphragms 22 and 24 at opposite sides thereof. The left-hand diaphragm 22 is a so-called range diaphragm having a predetermined specific spring-rate, e.g. about 40 lbs./inch. The other diaphragm 24 has a very low spring-rate, and is essentially a slack diaphragm. The two fluid pressures to be measured are separately conducted to the respective diaphragms by the usual means (not shown) for differential-pressure instruments.

Extending up from the body assembly 29 is a stem 26 serving as a protective conduit for electrical connector wires leading to an electronic enclosure generally indicated at 28, and comprising a rectangular center member 30 and two cylindrical side sections 32, 34. This enclosure contains various electrical components required for operation of the instrument, and connections thereto. Principally these components comprise a solid-state transmitter as disclosed in the above-identified copending application Ser. No. 732,129, and which thus will not be described in detail herein. In brief, this transmitter includes means to induce vibration of a taut wire at a frequency corresponding to the wire tension, and means to produce a d-c measurement output signal the magnitude of which reflects the vibration frequency. The cutaway portion of FIG. 1 shows at 36, behind the slack diaphragm 24, one of the two electrical connectors leading to the transmitter circuitry.

Figure 3:
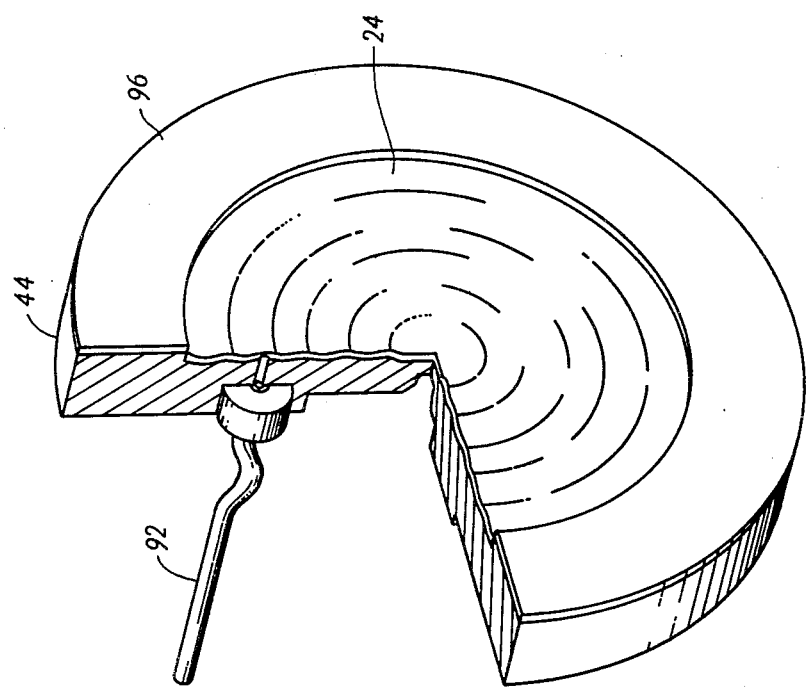
FIG. 3 provides a perspective view of the two diaphragm subassemblies of the instrument shown in FIG. 1, partially cut away to show certain interior elements.
Figure 3:
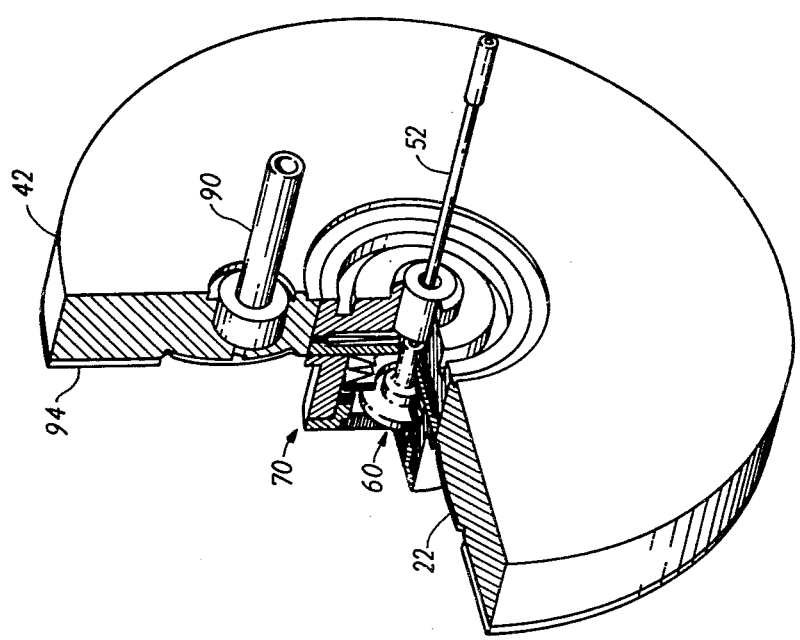

As shown in FIG. 2, the body assembly 20 includes a central body member 40 having secured thereto solid back-up plates 42 and 44 for the diaphragms 22 and 24. A vibratable wire 50 of round cross-section with a preselected small diameter (advantageously less than 0.020", and preferably 0.010" for the present embodiment) extends centrally through interior spaces within the body member and the back-up plates. Surrounding the wire throughout much of its length is a small-diameter elongate tube 52 (see also FIG. 3). The right-hand end of this tube is closed, and the corresponding end of the wire is secured to the closed end. The left-hand end of the tube is supported by a cylindrical insulator sleeve 54 e.g. of ceramic, which in turn is secured through associated parts to the left-hand back-up plate 42.

Figure 4:
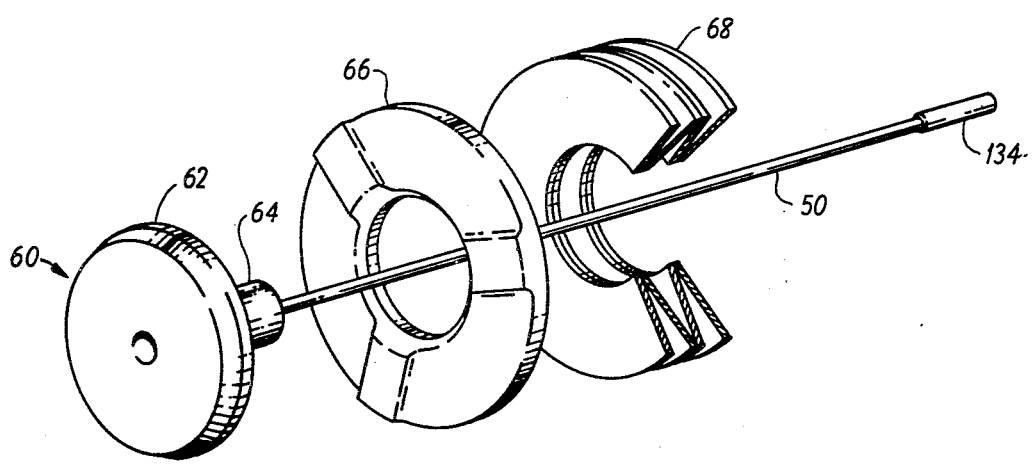
FIG. 4 provides a perspective view of elements used to transmit the tensioning force to the wire.

The left-hand end of the wire 50 is fastened to a movable end-piece 60 in the form of a button (see also FIG. 4) having a peripheral flange 62 and a central hub 64 to which the wire is attached, as by brazing. A spacer ring 66, with three radial ribs for assuring stable seating, bears against the right-hand surface of the button flange 62 to apply a leftwardly-directed force to tension the wire. This force is transmitted to the spacer ring 66 through an over-range spring 68 comprising two sets of interconnected Belleville-type washer elements (also sometimes referred to as coned-disc springs).

Figure 8:
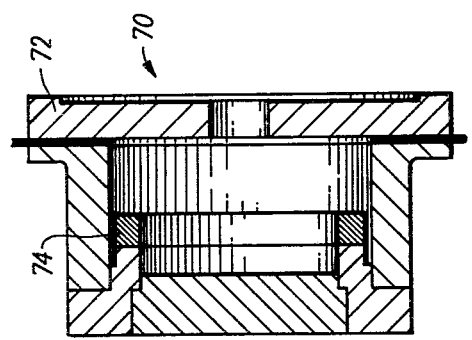
FIG. 8 is a detail section showing the configuration of the force-transmitting member carried by the range diaphragm.

The over-range spring 68 is held pre-stressed to a force of about 11 lbs. by elements of a diaphragm hub assembly generally indicated at 70 (see also FIG. 8). This assembly includes a circular plate 72 against which the right-hand end of the spring 68 bears, and further includes an integral ring-shaped element 74, outboard of and concentric with the button flange 62, which restrains leftward movement of the spacer ring 66. Thus, in normal operation of the instrument, the hub assembly holds the spring 68 in a state of predetermined, fixed compression.

The hub assembly 70 is secured to the inner edge of the range diaphragm 22 to receive the force developed by that diaphragm in accordance with the differential pressure to be measured. During normal operation of the instrument, e.g. operation within the selected wire force range of up to about 9 lbs., the pre-loaded over-range spring 68 acts effectively as a solid (infinite stiffness) force-transmitting element to functionally couple the hub assembly 70 to the end of the wire 50 so that the force developed by the range diaphragm 22 is applied directly to the wire.

The hub assembly 70 also receives, in addition to the force from the range diaphragm 22, an initial wire-tensioning or "zero-set" force from a zero spring 80. This spring preferably comprises a pair of nearly flat, interconnected washer-like element surrounding the wire, and may for example be formed with spiral cut-outs (not shown) to increase their flexibility. In the disclosed embodiment, these spring elements produce a force of about 2 lbs. which determines the wire tension in the absence of any force from the range diaphragm 22. As the length of the wire changes, these interconnected spring elements 80, being secured together at their inner edges, provide for movement in the nature of a parallelogram, so as to assure that the spring force remains aligned concentrically with the axis of the wire. The total amount of change in wire length is about 0.0015", so that there will be no significant change in the spring force as the diaphragm 22 strokes through the full extent of the instrument span.

The back-up plates 42 and 44 present carefully shaped diaphragm support surfaces precisely matching the shapes of the associated diaphragms, and thus provide a stable support for those diaphragms in the event of an over-range pressure condition forcing either diaphragm against its back-up plate. When the instrument is within its normal range of operation, these plates define enclosed regions of small volume adjacent each diaphragm, and these regions, together with other internal cavity regions within the body assembly 20 (including the interior of the tube 52), form a sealed internal chamber which is filled with a fill-liquid 84.

The two enclosed regions behind the respective diaphragms 22 and 24 are in liquid communication with each other through a passageway comprising a first tubular member 90 (see also FIG. 3) secured to the first back-up plate 42, and a second tubular member 92 secured to the other back-up plate 44. The diaphragms are held in place on the corresponding back-up plates by respective weld rings 94, 96, of the usual construction.

When the instrument is used to measure the difference between two fluid pressures, the lower pressure is applied against the range diaphragm 22 having a predetermined spring-rate, e.g. of about 40 lbs./in. The higher fluid pressure is applied to the right-hand diaphragm 24 which is a slack diaphragm having a spring-rate much lower than that of the range diaphragm. The spring-rate of the wire 50 is considerably higher than that of the range diaphragm 22, and may for example be about 4000 lbs./inch.

The spring-rate of the slack diaphragm 24 is very nearly zero throughout the normal operating range of the instrument. Under such conditions, the pressure in the fill-liquid 84 within the sealed chamber will be essentially equal to the higher of the two applied pressures, i.e. the pressure which is applied to the slack diaphragm 24.

Accordingly, the range diaphragm 22 will develop a net force proportional to the pressure differential to be measured, and this net force is applied as a tensioning force to the wire 50 (in addition, of course, to the initial fixed force from the zero spring 80 as previously described). This net force controls the frequency of vibration of the wire 50 in accordance with well established physical laws, so that the vibration frequency becomes a measure of the differential pressure to be measured.

In order to induce vibration of the wire 50, its ends are connected to an oscillatory circuit (as described in the above-identified application Ser. No. 732,129) having positive feedback characteristics and arranged to produce an alternating flow of current in the wire. By developing a steady magnetic field through the wire, perpendicular to the wire axis, lateral forces are produced on the wire due to interaction between the oscillatory wire current and the magnetic flux. The wire 50 and the tube 52 are made of non-magnetic materials to assure that these lateral vibratory forces are properly developed.

Figure 5:
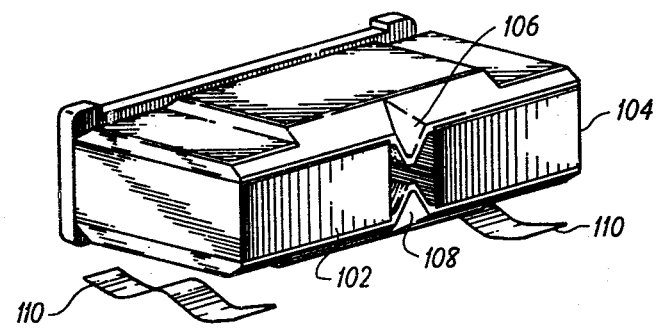
FIG. 5 is a perspective view of the magnet assembly without the wire-enclosing tube.
Figure 6:
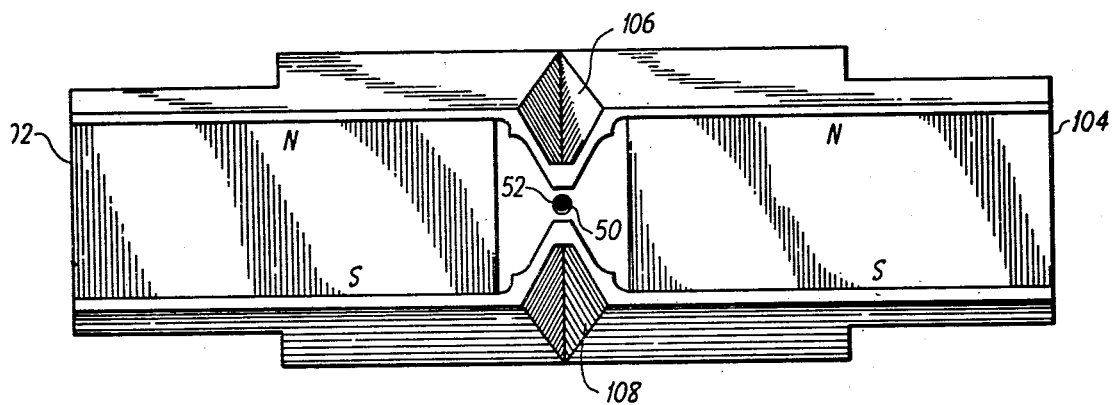
FIG. 6 is an elevation of the magnet assembly with the wire and its surrounding tube enclosure shown in section.

In the present embodiment, a very intense, magnetic field is produced through the wire 50 by means of a magnetic structure (see especially FIGS. 5 and 6) including two side-by-side permanent magnets 102, 104 coupled to opposed V-shaped pole-pieces 106, 108 positioned on opposite sides of the tube, closely adjacent thereto. These magnets should be made of material providing the strongest possible magnetic field. Preferably the magnet material is a rare-earth/cobalt combination, such as a samarium-cobalt magnet which in the disclosed arrangement produces a flux density of about 18,000 gauss in the wire. The magnetic structure is held in place by magnet retaining springs 110.

One important advantage resulting from the use of a small liquid passageway for the wire 50, as provided by the tube 52, is that it permits mounting of the magnet pole-pieces 106, 108 very close to the wire, thus assuring good field strength and consequent strong vibration of the wire. In the preferred embodiment, the gap between the pole-pieces was about 0.045". The tube 52 had an outer diameter of 0.041" and an inner diameter of 0.026", while the wire diameter was 0.010".

The electrical current for the wire is supplied to the right-hand end of the vibratable wire 50 by the connection 36 (FIGS. 1 and 2) which leads to the electronics enclosure 28. The return path for this vibratory wire current is completed from the left-hand wire end, through the button 60, the spacer 66, the hub assembly 70, and the range diaphragm 22 to the instrument chassis (i.e. electrical ground), and thence through a wire (not shown) to the electronics enclosure.

At the low limit of the wire tension (about 2 lbs., as set by the zero spring 80), the vibration frequency in the preferred embodiment typically was about 1750 Hz. At the high end of the operating range, with a wire tension of about 9 lbs., the vibration frequency typically was about 3100 Hz.

One of the more serious problems presented by an instrument of the type described herein is errors caused by changes in ambient temperature. That is, the frequency of wire vibration is a function of the temperature of the instrument. There are several contributing factors to such temperature errors. One particularly significant factor is caused by variations in viscosity of the fill-liquid 84 within the sealed interior.

The viscosity of a fill-liquid ordinarily will be temperature-dependent, typically increasing with decreasing temperatures. An increase in viscosity results in a reduction in wire vibration frequency, as though the liquid molecules, as they became more viscous, are more strongly adhered to the wire so as to raise the effective mass of the wire. Since vibration frequency is inversely related to the mass of the wire, an increase in viscosity thus can be understood to decrease the frequency of wire vibration (other things being equal).

To minimize the effect of temperature-induced changes in viscosity, it is desirable to use a fill-liquid having a relatively low viscosity. It has been found advantageous in that regard to use a fill-liquid having a room-temperature viscosity of no greater than about 1 centistoke.

Also of importance is the use of a fill-liquid having a low viscosity temperature coefficient. The most serious effects of changes in viscosity are found at the low-temperature end of the commercially-important temperature range of −40° F. to 180° F. For example, liquid viscosity may change by 200% to 300% when the temperature drops from room temperature to −40° F. Thus the fill-liquid should be selected to provide for minimum viscosity temperature coefficient in those low temperature ranges. It particularly has been found desirable to use a liquid having a coefficient less than about 0.05 centistokes/°F. at 0° F. A fill-liquid having such a characteristic, and also a room-temperature viscosity only about 1 centistoke, is a silicone oil designated DC 200 and sold by Dow Corning.

By selecting the fill-liquid 84 in accordance with the above criteria, the problems caused by temperature-induced viscosity changes will be reduced. However, for many applications it is desirable to further minimize the effects of changes in viscosity. In accordance with another aspect of this invention, this has been effected by compensation means for altering the tension on the wire 50 with changes in temperature, so as to tend to negate the changes in viscosity.

Specifically, in the preferred embodiment disclosed herein this compensation is achieved by utilizing a zero spring 80 having a negative thermal effect. That is, the force of the spring 80 decreases with increases in temperature. Thus, as the temperature goes down, the spring force increases, tending to increase the vibration frequency, so as to compensate for the effect of corresponding temperature-induced viscosity changes on wire vibration.

This negative thermal spring characteristic was achieved by selecting for the zero spring 80 a material having an elastic modulus which increases as the temperature decreases, thus increasing the spring force. The spring material in the preferred embodiment was a known commercial product referred to as "Carpenter Custom 445", a form of stainless steel made by the Carpenter Steel Co.

Superior performance of a vibrating-wire instrument has also been found to result from providing a high ratio between the densities of the wire 50 and the fill-liquid 84. This ratio should be at least 10, although desirably the ratio should exceed 20 for best overall operation. In the preferred embodiment, the density of the wire (made of Iridium) was about 21 grams/cubic centimeter, and the density of the silicone-oil fill-liquid was about 0.818 gms/cu. cm. at 77° F., thus giving an excellent ratio of about 25. With an Iridium wire, the tube 52 advantageously is made of Tantalum, since it has a temperature coefficient of expansion very nearly that of Iridium.

Iridium also is superior as a vibrating wire because it has a high modulus of elasticity, resulting in very small stretching of the wire, and also because it has low electrical resistivity. Moreover, it is readily secured to the associated parts as by welding or brazing.

Regardless of the ratio of wire-to-liquid densities, the density of the wire should be high in any event, preferably at least 10 gms./cu. cm., and advantageously over 20 gms./cu. cm. As noted above, Iridium is superior in this respect, having a density of 21 gms./cu. cm. Tungsten wire also has a suitably high density, and will perform well in the instrument.

Another significant factor contributing to temperature errors is the change in liquid volume which occurs with changes in temperature. A silicone oil of the type referred to above will expand about 6%/100° F. This liquid expansion will produce forces pushing the diaphragms outwardly, and tending to increase the pressure within the fill-liquid thereby correspondingly altering the wire tension and the measurement output signal.

To minimize the effect of changes in liquid volume with changes in temperature, it is important, first, to design the instrument so that the volume of fill-liquid is quite small. Thus the spaces between the diaphragms 22, 24 and their back-up plates 42, 44 should be small, as should the connecting passageways therebetween and any other parts of the instrument containing fill-liquid. A significant advantage of the use of a small cross-sectional tubular passageway for the wire 50 is that only a minimal amount of liquid will be contained by such passageway (which in this embodiment basically comprises a tube 52). By use of such tubular passageway, and other design arrangements described herein, the total liquid volume in the sealed interior chamber of the instrument was, in one preferred unit as shown herein, held to about 0.06 cubic inches.

Even with a minimum amount of fill-liquid, there still will remain some effects of the expansion of the liquid. Such expansion can be accommodated by bulging of the diaphragms 22, 24 but if the diaphragms are of conventional design with typical spring-rates, the diaphragm movement will cause additional pressure to be applied to the fill-liquid, thus changing the wire tension and correspondingly causing an error in the measurement. Accordingly, it is advantageous in reducing this error to form the right-hand diaphragm 24 as a so-called slack diaphragm, whereby the spring-rate of the diaphragm is very low, much lower than the spring-rate of the range diaphragm 22. Although the slack diaphragm wil bulge out as the liquid expands, the change in pressure of the fill-liquid will remain low, with a correspondingly small effect on the frequency of wire vibration.

A further serious problem presented by an instrument of the type described herein is that changes in static pressure cause corresponding changes in the measurement signal. As the external pressure on the two diaphragms 22, 24 increases, for example, the diaphragms will move inwardly a small distance, due at least in part to the compressibility of the fill-liquid. As the range diaphragm 22 moves in (to the right), it tends to slacken the wire 50, and thereby lower its vibration frequency, which appears as an error in the measurement. In accordance with a still further aspect of this invention, however, this static pressure error is substantially reduced by a compensating arrangement now to be described.

Static pressure compensation is achieved in the disclosed instrument by an arrangement wherein the wire-enclosing tube 52 is formed with a closed end to which the wire 50 is attached. Thus, as the liquid pressure increases due to an increase in static pressure (e.g. from 2000 psi to 3000 psi), there will be a corresponding increase in the force pushing against the closed end of the tube. This increase in force will effectively stretch the tube a small amount, thus moving the right-hand end of the wire away from the back-up plate 42. Accordingly, as the increased static pressure moves the range diaphragm 22 to the right to tend to slacken the wire, that same pressure increase moves the far end of the wire to the right to tend to increase the wire tension. By properly proportioning the relative sizes of the parts involved these two opposing effects can be made to nearly cancel one another, so that there will be only very small changes in output signal resulting from changes in static pressure.

Figure 9:
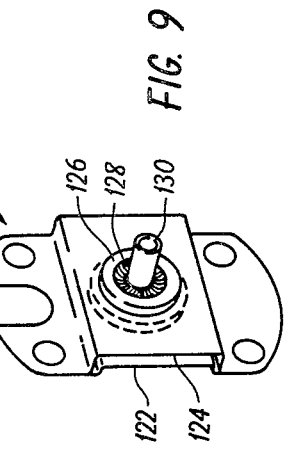
FIG. 9 shows the flexure support for the closed end of the wire-enclosing tube.

It will be seen that the right-hand end of the tube 52 must move longitudinally to achieve this compensation. To accommodate this movement with structural stability, and also to assure that the wire vibration does not shake the tube, a flexure support 120 (see also FIG. 9) is secured to the end of the tube, to permit axial movement and yet provide lateral constraint. This support includes two spaced parallel flexures 122, 124 which are bolted at their upper and lower ends to the central body member 40. At their central regions these flexures are secured to a metal ring 126 which holds the two flexures spaced apart with a uniform separation.

Figure 7:
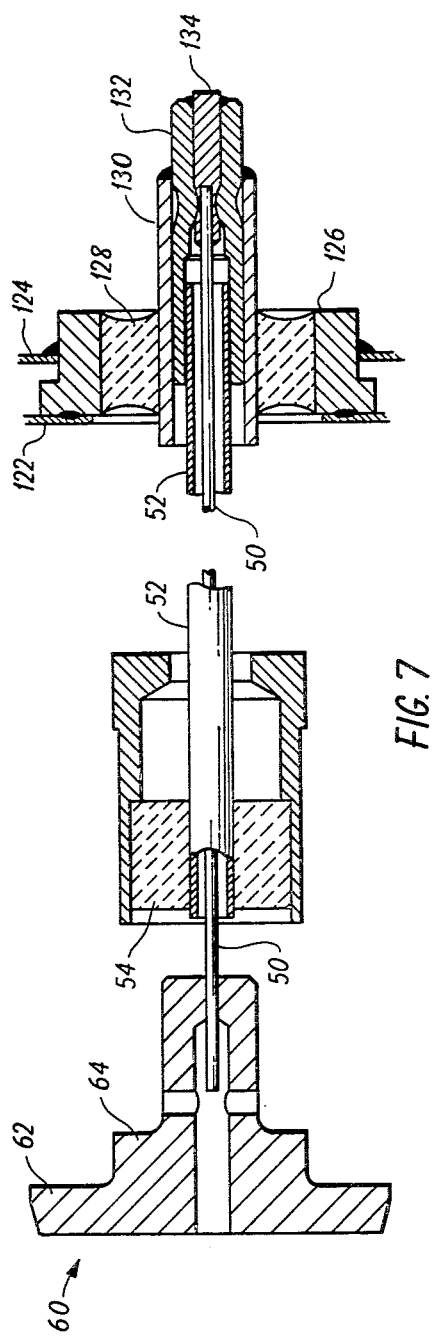
FIG. 7 is an enlarged longitudinal section of the wire and the tube assembly.

The ring 126 forms part of a metal-to-glass seal structure (see also FIG. 7) including an insulator ring 128 and an inner metal sleeve 130. This latter sleeve is in turn fitted over and secured to another sleeve 132 of Invar having a stepped inner surface. The right-hand end of this stepped sleeve receives and is secured to a Monel pin 134 to which the end of the wire 50 is secured. The left-hand end of the stepped sleeve is secured to the Tantalum tube 52. Thus, the flexure support 120 affords lateral constraint for this end of the tube, while permitting it to move axially in response to changes in the pressure of the fill-liquid, or changes in temperature of the tube material.

The inner sleeve 130 also receives the electrical connector 36 from the electronic transmitter circuitry 28. This sleeve completes the electrical connection through the stepped sleeve 132 to the end of the wire 50 and the tube 52, which thus both are at a voltage different from ground (i.e. the instrument chassis). As noted before, the left-hand end of the tube is electrically isolated from ground by the ceramic insulator sleeve 54. The outer surface of the tube also preferably is covered with a layer of Mylar insulation.

Tests with instruments of the type described herein have shown that the resonant vibration frequency of the wire presented some anomalies. Specifically, in some of the instruments, a wire under a fixed tension would appear at times to resonate alternately at two distinct frequencies, e.g. 2000 Hz and 2002 Hz. Such a double-resonance characteristic would of course make the instrument quite unreliable for commercial use.

This problem has been solved however through the discovery that the double-resonance phenomenon resulted from the fact that the wire 50 typically is inhomogeneous, having an irregularity or non-uniformity about the wire axis. Thus, the resonant frequency in one plane through the axis can be significantly different from the resonant frequency in another plane through the wire axis. In more detail, it has been found that typically the wire will have two preferred planes of vibration, with different resonant frequencies. These two planes ordinarily are at right angles to one another, and the amplitude of vibration in one plane will be larger than that in the other plane.

In furtherance of this discovery, a procedure has been developed for determining which vibration plane produces the maximum amplitude of vibration, and for so positioning the wire in the instrument with respect to the direction of the magnetic field that the wire will be caused to vibrate in the maximum amplitude plane. In accordance with this procedure, the wire 50 is placed under tension in air, and is caused to vibrate in the normal manner by means of electrical circuitry as previously referred to. The magnetic field though the wire is produced by a magnet which is mounted for rotation about the wire axis, thus changing the direction of the magnetic field through the wire without changing its magnitude. As the magnet is rotated about the wire, the plane of vibration also rotates about the axis of the wire.

By observing the amplitude of the alternating electrical signal developed by the wire as the magnet is rotated, the two mutually-perpendicular large-amplitude vibration planes will be found, and the one producing the larger vibration can be selected. The selected preferred plane then is marked on the fixture holding the wire, and when that wire is assembled with its instrument, it will be positioned so that the selected plane of vibration is perpendicular to the direction of the magnetic field.

Turning now to another problem with instruments such as described herein, if an over-range condition occurs on the high-pressure side, such that the range diaphragm 22 develops at the hub assembly 70 a force greater than 11 lbs. (including the force from the zero spring 80), the over-range spring 68 will compress to absorb the additional force beyond its 11 lbs. of preloading. The hub assembly will correspondingly move to the left as the over-range spring compresses, but there will be essentially no corresponding movement of the end-piece 60. If the over-range condition is severe, the slack diaphragm 24 ultimately will bottom against its back-up plate 44, before the over-range spring 68 reaches the limit of its compressibility. Thus the wire is protected from excessive strain and consequent damage.

When an over-range condition occurs on the low-pressure side, the range diaphragm 22 will move to the right and ultimately bottom on its back-up plate 42, and the button 60 will lift off from the spacer ring 66. This will result in the wire 50 becoming slack, but no damage will be done to the wire. The amount of permissible diaphragm stroke is quite small, e.g. about 0.055".

It should also be noted that these back-up plates 42, 44 preferably are formed of a magnetic material, such as the stainless steel referred to as E-Brite. Thus the back-up plates additionally serve as magnetic shields for the magnets 102, 104, to reduce the magnetic flux in the region of the diaphragms 22, 24 and minimize the chance of attracting particles from the process fluid.

Figure 10:
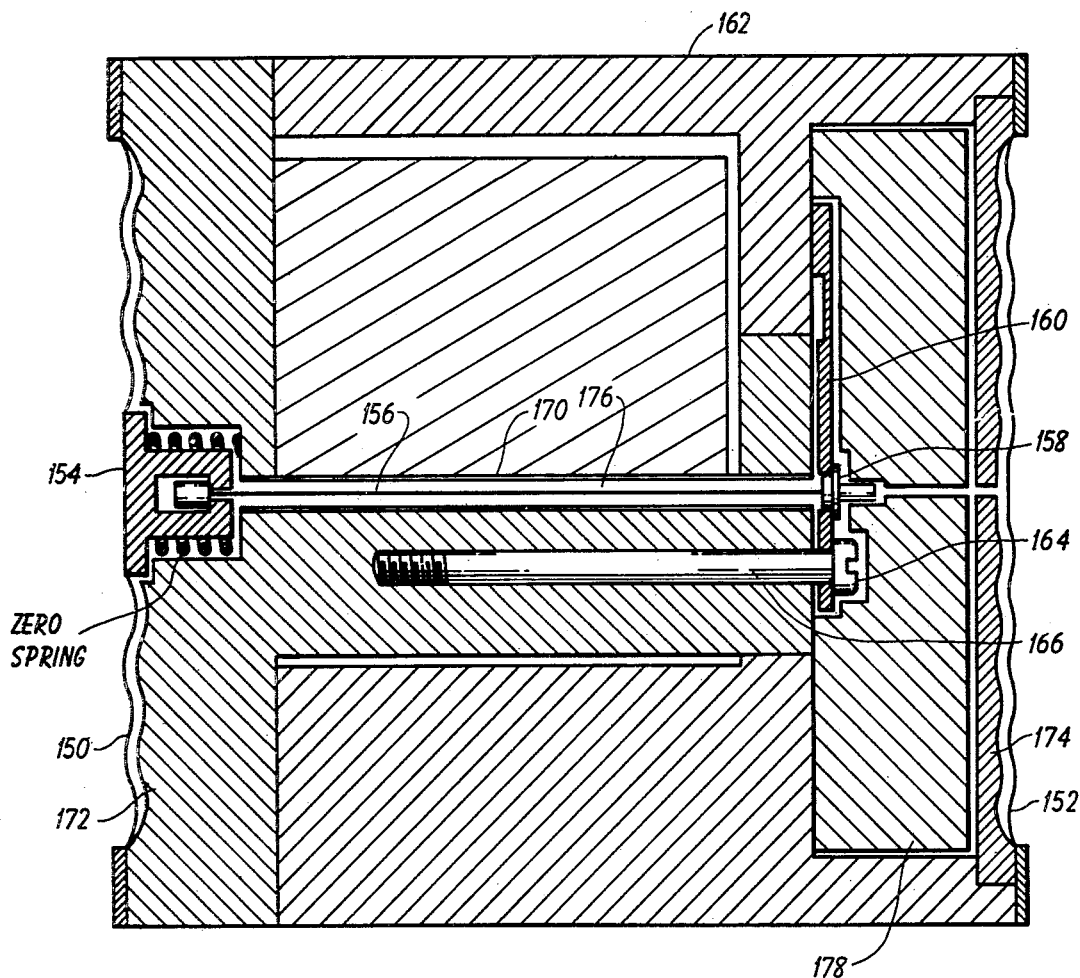
FIG. 10 is a vertical section through a second embodiment of the invention.

Referring now to FIG. 10, there is shown another embodiment of the invention incorporating a different arrangement for compensating for temperature-induced changes in fill-liquid volume. This instrument is like that of the preceding drawing figures, including range and slack diaphragms 150, 152 sealing an enclosed chamber containing a fill-liquid. The range diaphragm carries an end-piece 154 coupled to one end of a vibratory wire 156, to apply a tensioning force thereto. The other wire end is secured to a ceramic insulator in the form of a glass bead 158, and which in turn is held by a cantilever over-range spring 160 fixed at its upper end to the central body member 162.

The rightward motion of the cantilever spring 160 is restrained by the head 164 of a bolt 166 engaged with the body member 162. During normal operation of the instrument, the spring 160 presses against the bolt head 164, and thus serves to hold the glass bead 158 fixed in position, against the pulling force applied to the wire by the range diaphragm 150.

A small-diameter tube 170 surrounds the wire 156, and is secured at both ends to the central body member 162. This tube forms part of the interior sealed chamber, which also includes the enclosed regions between the diaphragms 150, 152 and their respective back-up plates 172, 174, and a connecting passageway 176 leading from the right-hand diaphragm region through a large block 178, to the region of the glass bead 158.

The large block 178 is located within a corresponding space within the sealed chamber within the instrument. This space almost matches the block in size, and the fill-liquid occupies the small spaces around the block. The block is not physically secured to the body member 162, and thus is effectively floating within the sealed chamber.

The block 178 is made of Invar, a material having an extremely low coefficient of thermal expansion, very nearly zero. The other portions of the instrument comprising the sealed chamber for the fill-liquid, however, have a normal (relatively high) temperature coefficient of expansion. When the temperature of the instrument increases, those other portions of the instrument expand, thereby increasing the size of the sealed chamber. The block 178 however remains essentially the same size. By properly selecting the volume of the block 178 relative to the total volume of the sealed chamber, the temperature-induced increase in the net volume of the chamber (i.e. less the block 178) can be proportioned to match the volumetric expansion of the fill-liquid, thus preventing significant effect on the pressure of the fill-liquid due to its volumetric expansion.

The embodiment of FIG. 10 also includes a modified over-range protection arrangement. If a high-pressure over-range occurs, the range diaphragm 150 will, as before, move to the left, tending to develop an excessive force on the wire 156. However, when the normal wire force is exceeded, the cantilever spring 160 will bend, moving to the left to lift off from the bolt head of 164 and thereby prevent excessive strain of the wire. With a severe over-range condition, the slack diaphragm 152 will bottom against its back-up plate and prevent any further development of pressure in the fill-liquid. This bottoming on the back-up plate will occur before the cantilever spring has reached the point where it will engage the body member 162, thus assuring that the wire will not be damaged from the over-range condition.

Although preferred embodiments of the invention have been described herein in detail, it is desired to emphasize that this is for the purpose of illustrating the principles of the invention, and should not necessarily be construed as limiting of the invention since it is apparent that those skilled in this art can make many modified arrangements of the invention without departing from the true scope thereof.

I claim:

1. A vibratable-wire instrument for producing a measurement signal corresponding to an applied differential pressure, comprising:

body means providing an interior cavity with openings at first and second opposite ends of said body means;

first and second diaphragms secured to said body means and sealing off said first and second openings respectively to define a closed internal chamber, said diaphragms being arranged to receive on their outer surfaces respective fluid pressures the differential of which is to be measured;

a fill-liquid in said closed chamber;

a vibratable wire of small cross-section coupled at one end thereof to the central region of said first diaphragm and extending away therefrom substantially to the central region of said second diaphragm;

said first diaphragm being arranged to apply a pulling force to said one wire end corresponding to said differential pressure;

small-diameter tubular wall means forming an elongate passageway surrounding said wire throughout at least a substantial portion of its length extending from said first diaphragm towards said second diaphragm;

means securing the other end of said wire to prevent movement of said other wire end in response to tension applied by said first diaphragm within the operating range of said instrument;

said closed chamber in said body means including an ancillary section of relatively large volume disposed radially outwardly with respect to the axial line of said wire substantially beyond the wall of said elongate passageway;

a mass of material substantially filling said ancillary chamber section;

the temperature coefficient of expansion of said mass of material being substantially less than that of said body means defining said closed chamber;

the volume of said mass of material being predeterminedly related to the temperature-induced expansion characteristics of said fill-liquid and said body means to provide for changes in net volume of said chamber substantially corresponding to changes in volume of said fill-liquid;

said ancillary chamber section with said mass of material therein communicating with one end of said tubular passageway while providing for open communication of said fill-liquid between said one passageway end and the adjacent diaphragm.

2. Apparatus as claimed in claim 1, wherein said chamber section is arranged to communicate with the end of said passageway which is adjacent said second diaphragm.

3. Apparatus as claimed in claim 2, including support means for fixing the position of said securing means when the instrument is within its operating range;

said support means including elongate means engaged with said securing means in a first region of said body means radially outwards of said other wire end and extending therefrom in a direction parallel to the axis of said wire to a second region of said body means substantially closer to said one wire end;

said elongate means being secured to said body means in said second region.

* * * * *